(12) United States Patent
Radelet (10) Patent No.: US 6,573,455 B1
(45) Date of Patent: Jun. 3, 2003

(54) CABLE CLOSURE

(75) Inventor: Christiaan Radelet, Scherpenheuvel (BE)

(73) Assignee: Tyco Electronics Raychem N.V., Kessel-Lo (BE)

( * ) Notice: Subject to any disclaimer, the term of this patent is extended or adjusted under 35 U.S.C. 154(b) by 0 days.

(21) Appl. No.: 09/830,600

(22) PCT Filed: Oct. 19, 1999

(86) PCT No.: PCT/GB99/03454

§ 371 (c)(1),
(2), (4) Date: Apr. 27, 2001

(87) PCT Pub. No.: WO00/28634

PCT Pub. Date: May 18, 2000

(30) Foreign Application Priority Data

Jun. 11, 1998 (GB) ............................................. 9824447
Sep. 6, 1999 (GB) ............................................. 9913441

(51) Int. Cl.⁷ ......................................... H02G 15/113
(52) U.S. Cl. ......................................... 174/92; 174/93
(58) Field of Search ............................. 174/92, 138 F, 174/93

(56) References Cited

U.S. PATENT DOCUMENTS 4,805,979 A 2/1989 Bossard et al.
5,322,973 A 6/1994 Dagan

FOREIGN PATENT DOCUMENTS

| DE | 1804650 | 7/1970 |
| DE | 1813201 | 7/1970 |
| WO | WO 90/05401 | 5/1990 |
| WO | WO 95/23449 | 8/1995 |
| WO | WO 95/34929 | 12/1995 |

OTHER PUBLICATIONS

Copy of International Search Report.
Copy of International Preliminary Examination Report.
British Search Report for GB9824447.8.

*Primary Examiner*—Chau N. Nguyen
(74) *Attorney, Agent, or Firm*—Myers Bigel Sibley & Sajovec (57) ABSTRACT

Cable closures and methods are provided for enclosing a cable. The cable closure includes two half shells together forming an enclosed space for housing a cable, and a sealing strip positioned between peripheral regions of the half shells, at least one of the shells having a removable portion to provide a cable entry port. A cable sealing device may be positioned at the cable entry port such that a seal is provided between the sealing strip and each half shell and a cable entering through the port.

13 Claims, 9 Drawing Sheets

CABLE CLOSURE

RELATED APPLICATIONS

The present application is a National Phase application of PCT/GB99/03454 filed on Oct. 19, 1999 and published in English, which claims priority from Applications GB 9824447.8 filed on Nov. 6, 1998 and GB 9913441.3 filed on Jun. 9, 1999.

FIELD OF THE INVENTION

This invention relates to a cable closure, by means of which environmental protection may be provided around a cable splice, termination or other cable portion. The invention may be used with power cables, CATV cables or telephony or other communications cables. The invention is likely to find most use in protecting splices in, and terminations of, optical fibre cables.

BACKGROUND OF THE INVENTION

The use of closures for environmental sealing of cable splices is of course well known. Cables are produced in finite lengths and therefore lengths of cable frequently need to be joined together. The function of a closure is to provide a seal that bridges the jackets of the spliced cables. A closure may also provide other functions in addition to environmental protection, such as mechanical protection and axial-pull strength. Closures may be used around simple end-to-end splices between cables, but frequently more complex splices require sealing. For example, a large cable containing many conductors (by which term I include optical fibres as well as electrical conductors) may be split into two or more smaller cables. Ultimately, a cable will be effectively terminated where it is broken down to single conductors or small groups of conductors. Such terminations also require cable closures to protect them.

It is frequently necessary to install a cable closure around a cable splice (or termination) where access to ends of the cables is not available. In such circumstances the closure clearly cannot be permanently of closed cross-section: the closure needs to be "wrapped around" the cables, rather than slid onto the cables from one end. This term "wrap around" derives from cable closures that were formed from flexible sleeves or longitudinally-slit tubes. It is, however, a general term that merely refers to the capability of installation around a cable at some point between its ends. Thus, the term includes substantially rigid half shells that are assembled around the splice. The shells may be hinged or otherwise linked together by moulded-in strips or by tapes or living hinges etc. The term "half shells" does not imply any particular shape, and the two half shells may be different or generally similar in shape to one another. Thus, each half shell will have a periphery that abuts the periphery of the other half shell, and each will have a hollow body portion, roughly semi-circular in cross-section, so that when the two half shells are brought together they define a roughly rectangular or circular cylindrical enclosed space within which the splice will lie. Half shells may, however, differ from one another, so that one might be described as a base plate, and the other as a cover. These terms "wrap around" and "half shells" are well-known in the art.

Many cable closures have been proposed that make use of half shells. Unfortunately, many problems remain. The performance requirements of a closure are very difficult to meet. The problem arises largely because a closure must be very quick and easy to install, usually with unskilled labour, and under difficult conditions, but must meet very stringent performance specifications. As a general rule a cable closure is expected to have a life time comparable to that of the cables which it protects, typically twenty or more years. Cables are generally situated out of doors and are subjected to extremes of temperature and humidity. Various tests have been devised to mirror this long-term performance. Although different tests are applicable to different cables in different situations, typical tests involve pressurisation of the closure whilst it is subjected to temperature cycling, often under wet or humid conditions. A closure is expected not to leak for a certain number of such cycles. Clearly, closures of the half shell design start out at a disadvantage because a seal must be provided between the half shells as well as between the incoming and outgoing cables and each half shell. A particularly severe problem arises at the region where a seal between the half shells meets a seal between the cables and each half shell. This region is known as the "triple point". It can therefore be seen that design of such a closure is a difficult matter.

The difficulties are, as usual, increased by the need for low cost. The requirement for low cost means that it is not possible to supply different designs of closure for each cable size and for each splice or termination configuration. Thus, a single design of closure must be able to accommodate, for example, a simple in-line splice between two cables, a butt splice between two cables (where the two cables lie side-by-side), and various configurations, such as "one in-two out" where one cable enters one end of a closure and two leave at an opposite end. In order to accommodate a range of splice configurations, one may decide to provide a closure that has four cables seals, two at each end. Cable seals are, unfortunately, expensive and such a closure would need to be provided with four such seals. Each of these seals would need to be capable, not only of sealing to an incoming cable, but also be capable of being closed in case the full compliment of cables was not to be employed. The present invention provides a particularly simple and elegant solution to these problems.

Before the invention is described in detail it may be worth noting some prior art closures of the half shell type. U.S. Pat. No. 5,322,973 discloses an aerial closure for protecting a cable splice. It has a central header portion and wing-like housing segments that may enclose the splice. The wing-like housing segments may be raised to provide access to the splice. Each end of the closure has a seal assembly for sealingly engaging the ends of the incoming cables. These assemblies have concentrically circular and corrugated features thereon so that an appropriately size hole may be cut to allow entry of 1, 2 or 3 cables of various sizes.

U.S. Pat. No. 4,805,979 discloses a fibre optic splice closure comprising a base to which a cable may be anchored, and a cover which overlies the base. Seals are provided around the cables at the position where the base meets the cover.

U.S. Pat. No. 4,492,816 discloses half shells for forming a cable splice. Half shells have flanges which abut one another in the assembled configuration. The adjacent flanges define a duct into which sealing material in the form of a paste may be introduced. Opposite ends of the resulting closure are provided with jaws which clamp against the incoming cables. Two jaws define between them a chamber which communicates with the sealing duct by means of a channel formed around the entire periphery of a jaw adjacent to the chamber.

EP 0543350 discloses a cable enclosure formed from a base and a cover which are secured together by bolts through flanged portions thereof. Various cable guide sections are located at the interface between the base and the cover.

GB 1260273 discloses a housing for electrical connections, which comprises a cylindrical central part and end parts that form a seal between the central housing and each incoming cable. The end parts are moulded to provide a number of cable entry ports. The ports are initially blind. The extreme ends of the ports are cut off as and when required to allow cables to pass through. The ports are heat-shrinkable so that after insertion of a cable a port can be shrunk to make sealing contact with it.

U.S. Pat. No. 5,109,467 discloses an optical fibre interconnect cabinet in the form of a box with a lid. The side walls of the box are provided with slots which can receive removable blanks. With the blanks in place, and the lid closed, the box is sealed. With the lid open, a blank can be removed to provide a port for cable entry.

Whilst each of those prior art designs provides some of the benefits that I now seek, each unfortunately suffers from one or more problems. For example, some of the designs are not fully "wraparound", some are not suited for environmental protection out of doors, some are too complex and expensive, and some do not provide the desired flexibility in terms of cable size and/or cable configuration.

I have now designed a cable closure that can provide excellent sealing for a variety of cable configurations, and which allows quick and simple installation.

SUMMARY OF THE INVENTION

Thus, the invention provides a cable closure comprising:
1) two half shells that together form an enclosed space for housing a cable (more particularly some part of a cable such as a termination or splice),
2) a sealing strip (preferably formed of a resilient material such as a rubber or a synthetic elastomer) positioned between a peripheral region of each half shell such that, when the half shell are brought together, said space can be sealed;
3) at least one of the shells having a removable portion that, when removed, provides a cable entry port between the two shells, the sealing strip providing a seal between that portion and the other shell (preferably a removable portion of the other shell when, as is preferred, each shell is provided with a removable portion).

The invention also provides a method of enclosing a cable, which comprises:
a) providing a cable closure as defined above;
b) removing said removable portion;
c) removing that part of the sealing strip that provided a seal between said removable portion and said other shell; and
d) bringing the half shells together around the cable such that a cable passes through the port provided by removal of the removable portion.

One of the half shells may have the form of a base and the other the form of a cover, or each half shell may have a generally hollow region which together form said space. Thus, each half shell may be, for example, substantially semi-circular, semi-rectangular or semi-elliptical, in cross-section such that when the half shells are brought together a generally cylindrical space is formed that is substantially circular, substantially rectangular particularly with rounded corners or substantially elliptical in cross section. In general it will be a desirable for each half shell to be formed, for example by moulding, from a single piece of material. Each half shell may, however, comprise two or more parts joined together, but this has the disadvantage that seals between those parts must be provided.

Where I refer to the sealing strip being positioned between "peripheral" regions of the half shells I simply mean that the sealing strip is towards the outside of the shells, although it need not of course be at the extreme edge. In general, the sealing strip will lie between peripheral flanges or edge walls of the half shells, which flanges or edge walls may extend outwardly of the sealing strip for example to provide means by which the half shells can be held together. Such means may comprise a bolt that passes through holes in the flanges or edge walls. It will be understood that it is desirable that such holes be provided outwardly of the sealing strip since otherwise a leak path into the splice case could exist via the holes.

I refer above to the space within the closure being capable of being sealed when the shells are brought together. This is because some additional sealing means or sealing operation may be required. However, in general, sealing between the half shells will result directly from the half shells being brought together with the sealing strip between them, although some fixing means such as the bolts mentioned above may be required to prevent the half shells from separating particularly if the closure is to be pressurised. Thus, the sealing strip preferably follows a substantially closed path around the periphery of the half shells. The sealing strip is preferably in one piece along its length, and may be continuous.

Complete sealing of the space within the closure will of course usually require some additional seal to be provided between incoming cables and the ports through which they enter. In general, a cable sealing device will be provided that is of annular shape, the outside surface of the annulus sealing against the internal surface of the port, and the inner surface of the annulus sealing against the external surface of the cable. Thus, the cable sealing device effectively fills any gap between the cable and the port through which it enters. The design of such cable sealing devices presents its own difficulties. These difficulties result in part from the need to be able to seal to cables of different sizes, since there will be some size variation even between cables of one nominally standard size. Furthermore, the cable sealing device needs to seal not only to the cable and to the surrounding half shells (where they define the port), but also to the sealing strip. This is the "triple point" problem referred to above. The cable closure of the invention is able to overcome this problem in a particularly elegant way. Thus, I prefer that at least one of the half shells (preferably both) is shaped to define, adjacent and inwardly of the port, a chamber for receiving a cable sealing device; and that the sealing strip run along opposed longitudinal sides of said chamber such that, when the sealing device is in the chamber, the strip at each said side contacts each half shell and the cable sealing device.

In preferred designs of the closure at least two said removable portions are provided side-by-side. A particularly preferred closure is designed to provide four cable entry ports, two side-by-side at each end. The closure may be supplied to the customer with one (or more) ports already open, that is with one (or more) potential removable portions being absent. The precise design will of course depend on the cable configurations possessed by the customer. Therefore, I prefer the closure to have at least two side-by-side ports, whether or not both of the ports in question have removable portions that would close them. I prefer that at least one of the half shells be shaped to define adjacently inwardly of each said port a chamber for receiving a cable sealing device; and that the sealing strip run along opposed longitudinal sides of each chamber such that, when a sealing device is in each chamber, the sealing strip at each said side contacts each half shell and the respective sealing device; and that separate portions of the sealing strip run between the chambers along each of the adjacent longitudinal sides. An alternative is possible; it would be possible for a single portion of sealing strip to run between the two side-by-side chambers. That single portion would therefore be shared by the two chambers.

That alternative arrangement is, however, less satisfactory because it would need to be rather wide, or the two chambers to be rather close, if that single portion of sealing strip were to contact both sealing devices.

These separate portions of sealing strip are preferably joined together towards an inward end of the chambers. In that way the seal is completed. Also, such a design allows the two half shells to be joined together by the means of, for example, bolt that passes through holes in the half shells; the holes would be positioned between the separate portions of sealing strip and outwardly of the position at which they are joined. In this way, the holes for the bolt do not provide a leak path into the splice case.

I prefer that the removable portion that gives rise to the cable port be an integral part of a half shell, although it may initially be separate and later bonded or otherwise sealing fixed to the half shell. The port preferably is formed substantially equally in each half shell, and therefore each half shell preferably has a said removable portion, both of which are to be removed to define the port.

In order that the cable sealing device form a good seal to the half shells, I prefer that the chambers (which will usually be defined by the inside surfaces of each half shell) be wholly concave in cross-section. Clearly, any irregularities in the curvature of the chamber will make a reliable seal difficult. If the cable sealing device is to seal a single cable then the external surface of the sealing device will preferably be substantially circular. However, I prefer that each sealing device be capable of sealing at least two cables, more preferably two cables side-by-side. In this case the cable sealing device need not be of simple annular shape, but may have, say, the shape of two annuli side-by-side with the roughly triangular spaces between them filled in. Overall, in cross-section the cable sealing device may be substantially elliptical. However, a circular cross-section may still be appropriate, particularly if four cables are to be sealed. Clearly, the chambers for the sealing device should have a cross-section or shape that corresponds to the sealing device, and will in general therefore be substantially circular or substantially elliptical in cross-section. The chambers may be provided with some fixing means such as one or more lugs or flanges to prevent axial movement of the sealing device.

The cable sealing device may be of the general design and construction disclosed in WO 90/05401 (N. V. Raychem S. A.). Thus, the sealing device may comprise along an axis thereof first and second end parts and a sealing material between them, the first and second ends parts and the sealing material each allowing a cable to pass through them, the device having means to bring the first and second end parts together thereby putting the sealing material under compression axially, and causing it to be displaced radially to contact a cable therein and the chamber therearound. In general, the first and second ends parts and the sealing material will be provided with an axial hole through which the cable can pass. Also, the first and second end parts and the sealing material may be provided with a radial slit that extends from their outer surface to said hole, which slit can be opened out to allow the sealing device to be "wrapped around" the cable. A preformed hole need not be provided in the sealing material since it may be possible to rupture the sealing material by pushing the cable through it.

The means that bring the first and second end parts together may comprise a nut and a bolt, one of which is fixed to one end part and the other of which bears against the other end part such that when they are relatively rotated the parts move together. Resilient means such as a spring, preferably a coiled compression spring, may be provided to bias resiliently together the first and second parts, thus maintaining the sealing material under compression during the service life of the closure.

The sealing material preferably comprises a gel, but other materials such as rubbers or mastics may be used. A gel is a liquid-extended polymer composition preferably having a cone penetration value (measured by a modified version of ASTM D217) within the range from 30 to 400 ($10^{-1}$ mm), and an ultimate elongation (measured by ASTM D412) greater than 100%, and preferably also with substantially elastic deformation to the elongation of at least 100%. The composition may contain three-dimensional cross-linked molecular formations, or merely behave as if it contains such molecular formations.

Useful compositions may be provided comprising at least 500 preferably at least 1000 and preferable not more than 5000 parts by weight of an extender liquid per 100 parts by weight of block copolymer or other polymer. Preferred block copolymers are those based on styrene and olefines such as ethylene and butylene. Particularly useful gels may be made using styrene-ethylene-butylene-styrene block copolymers such as those marketed by Shell under the trade name "Kraton". Such gels are disclosed in WO 90/05401 referred to above.

The sealing strip may be made of any suitable material, particularly a resilient material such as a rubber or synthetic elastomer. Examples include solid or hollow rubber, rubber foam and rubber gel. Such materials may be used in combination with other materials, for example a mastic, gel or other sealant. In this way, one component may provide a resilient bias and another component may be more deformable and be used to make intimate contact with the various surfaces. For example, a strip (of any suitable cross-section) of resilient material may be positioned in a channel or groove in one or both of the half shells. If desired, a sealing strip may be positioned in each half shell so that the two sealing strips contact one another when the two half shells are brought together. I prefer that the sealing strip or strips be continuous lengthwise (before a part is removed after removal of the removable portions of the half shells) in the region of the removable parts and along the sides of the chambers adjacent those removable parts. More preferably I prefer that the sealing strip (or each strip if one is positioned initially in each half shell) be unbroken along its length for the whole closure. However, in certain circumstances it may be desirable to use separate strips at each end of the closure.

BRIEF DESCRIPTION OF THE DRAWINGS

The invention will now be further described with reference to the accompanying drawings, in which:

FIGS. 6A–C; FIGS. 7A–B; FIGS. 8A–D.

DETAILED DESCRIPTION OF THE ILLUSTRATED EMBODIMENTS

Figure 1:
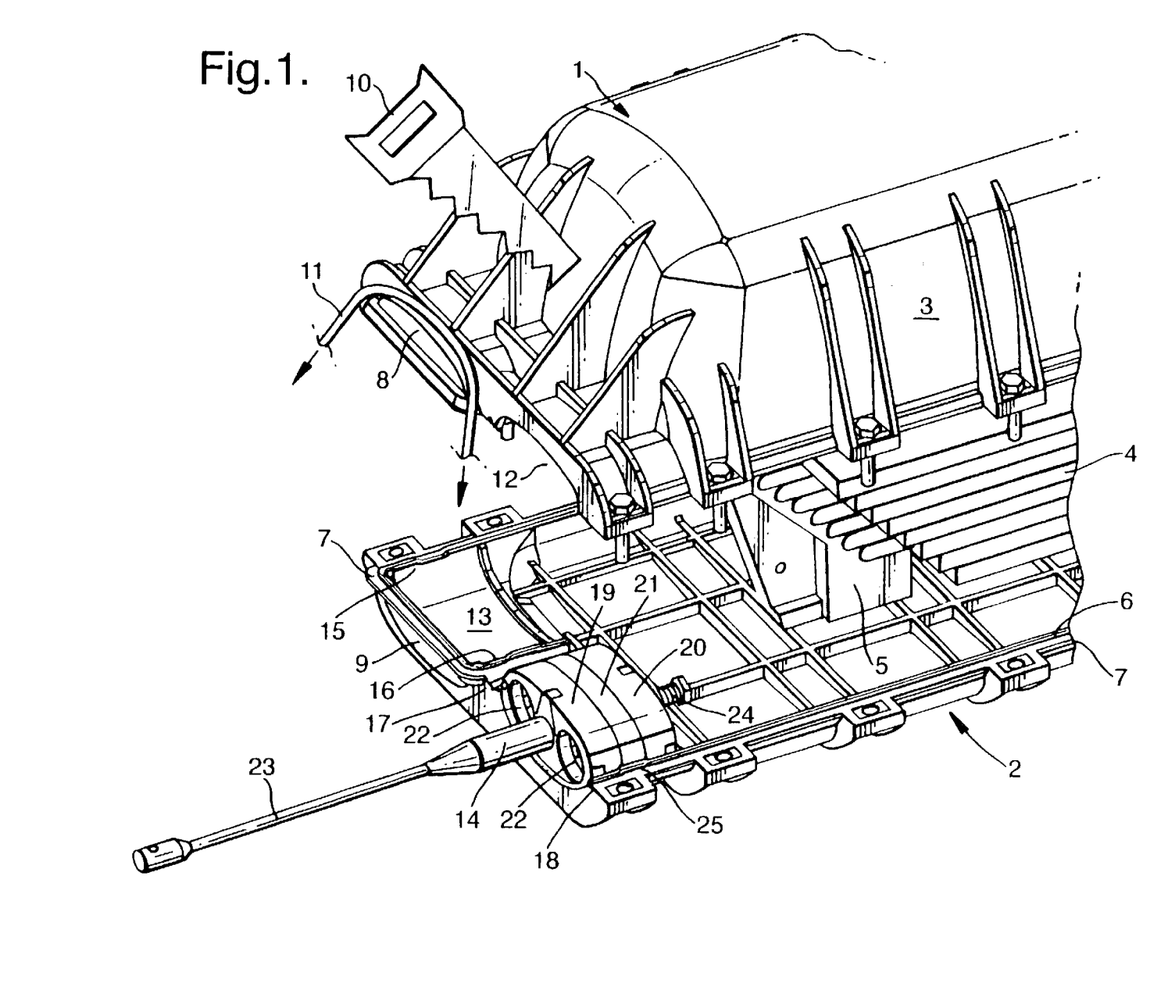
FIG. 1 is a perspective view of part of a cable closure showing two half shells separated.

FIG. 1 shows a cable closure, although the cables are omitted for clarity. The closure has two half shells, 1,2 which when brought together form an enclosed space 3. In the design illustrated the half shell 2 is slightly curved, but is largely planar, and half shell 1 has a dome-like shape. The closure contains optical fibre splice trays 4 pivotally mounted on a stepped base 5. The generally planer design of half shell 2 results in easier access to the splice trays 4 when the half shells are separated.

A sealing strip 6 is shown running around a peripheral region 7 of half shell 2.

The half shells have removable portions 8, 9 which can be removed by any suitable means such as by means of a saw 10, or knife, or cutting wire 11. When the portions 8 and 9 are removed, cable entry ports 12 are provided. Chambers 13 are provided adjacent, preferably immediately adjacent, and inwardly of the ports. The chambers are provided for receiving cable sealing devices 14, one of which is illustrated. It can be seen that the cable sealing strip 6 runs along opposing longitudinal sides 15, 16 and 17, 18 of the two chambers. Thus, when the sealing device 14 is positioned in the chamber 13, as is the case in the lower chamber illustrated, the strip at each longitudinal edge 17, 18 contacts not only the half shells, 1, 2 but also the sealing device 14.

The sealing device 14 has first and second end parts 19, 20 between which is positioned a sealing material 21. The end parts and the sealing material have holes 22 through which cables pass to enter the closure. A means 23, which may carry a screw thread is used to bring together the first and second end parts, 19, 20, to put the sealing material 21 under compression. The means 23 bears against the first end part 19 and its screw thread engages a screw thread fixed relative to end part 20. I prefer that means 23 carries a female screw thread and part 20 carries a male screw thread, although the situation may be reversed. Resilient biassing means such as a compression coil spring 24 is provided so that when the screw threads have been advanced a suitable amount, the spring maintains the sealing material 21 under compression. I prefer that the bias of the spring act over a sufficient distance such the sealing material may creep or otherwise be displaced to some extent without the resilient bias being lost.

It can be seen that when first and second end parts 19 and 20 are brought together the sealing material will be displaced to some extent in a radial direction to cause it to contact, and therefore to seal, to the internal walls of the half shells 1, 2 that define the chamber 13. The sealing material 21 will also be radially displaced inwardly to seal to cables extending through holes 22. The triple point referred to above exists at region 25 where the sealing material 21 and sealing strip 6 meet. This is a critical area which provides problems in many prior art closure designs. The present arrangement of the sealing strip in relation to the removable portions 8, 9 and to the chambers 13 allow these problems of the prior art to be overcome. Thus, in a simple and elegant fashion, a closure can be provided that is initially closed and that allows ports to be created and cables to be sealed within them.

The half shells illustrated in FIG. 1 shows various other features, such as strengthening ribs and flanges allowing the two halves to bolted together. Other means may be provided to bring and/or to hold the two together, for example latches, wedges or channels.

Figure 2:
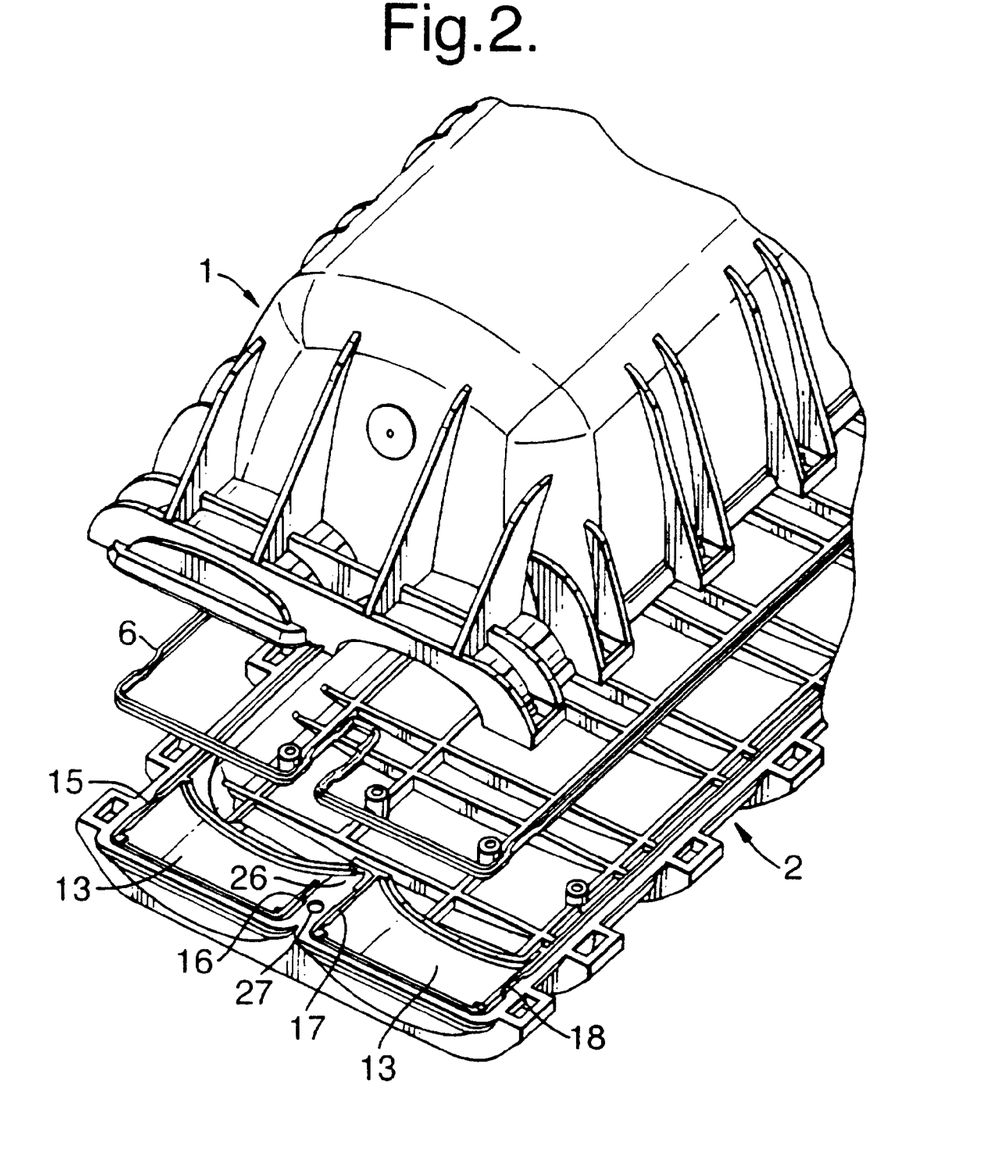
FIG. 2 is similar and shows in more detail a sealing strip.

The sealing strip is illustrated further in FIG. 2. FIG. 2 is an exploded perspective view showing the sealing strip positioned between the half shells, 1, 2. The wall of half shell 2 can be seen to be provided with means, in this case a ridge, for location of sealing strip 6. The path taken by the sealing strip 6 can clearly be seen to follow the opposing longitudinal sides, 15, 16, 17 and 18 of the two chambers 13.

Thus, it can be clearly seen that separate portions of sealing strip (corresponding to opposed longitudinal sides 16 and 17) run between the chambers. It was mentioned above that this arrangement is preferred to an alternative arrangement where a single length of sealing material runs between the two chambers. It can be appreciated that it will be difficult for such a single length of material to bridge two sealing devices 14 (not shown in FIG. 2). These two portions of the sealing strip 6 are joined together at 26 to complete the seal (the join is preferably nominal, and the strip is preferably of a continuous length at least in this region). This arrangement is particularly advantageous since it allows the two half shells, 1, 2 to be joined together with means of a bolt or other fixing device that passes through holes 27. It can be seen that the holes 27, being outward of the sealing strip, cannot provide a leak pass into the closure.

Figure 3A:
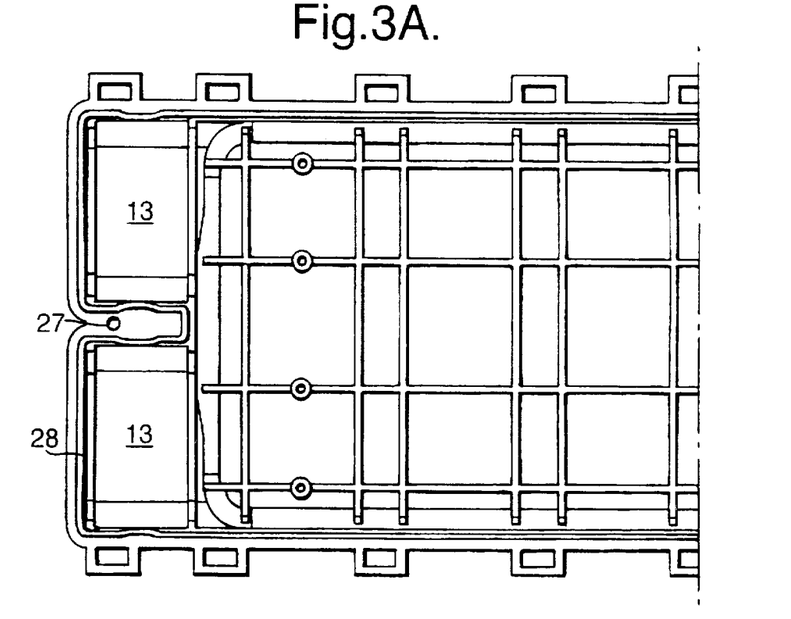
FIGS. 3a and 3b are plan views showing a sealing strip before and after part of it is removed.
Figure 3B:
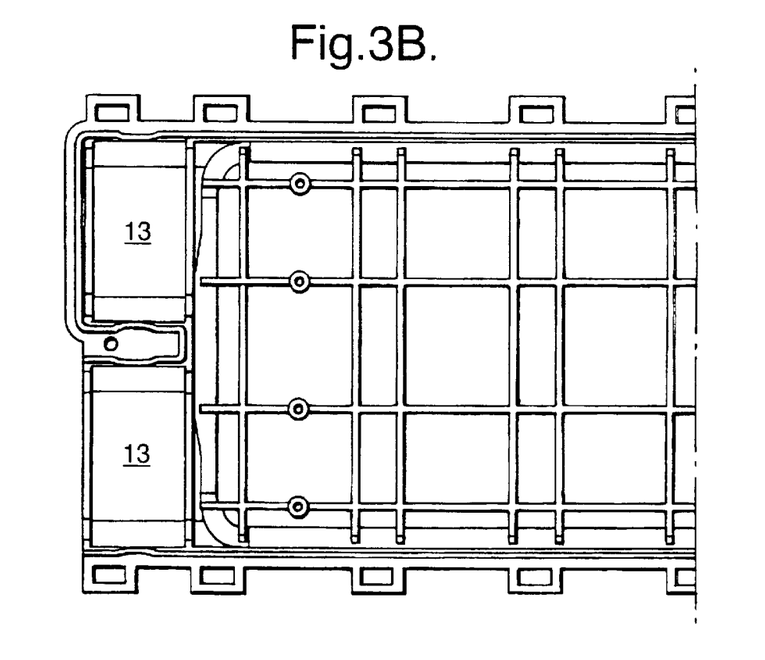

FIGS. 3a and 3b show in plan view the sealing strip 6 before and after removal of that part 28 thereof that originally provided a seal between opposing removable portions 8, 9.

Figure 4A:
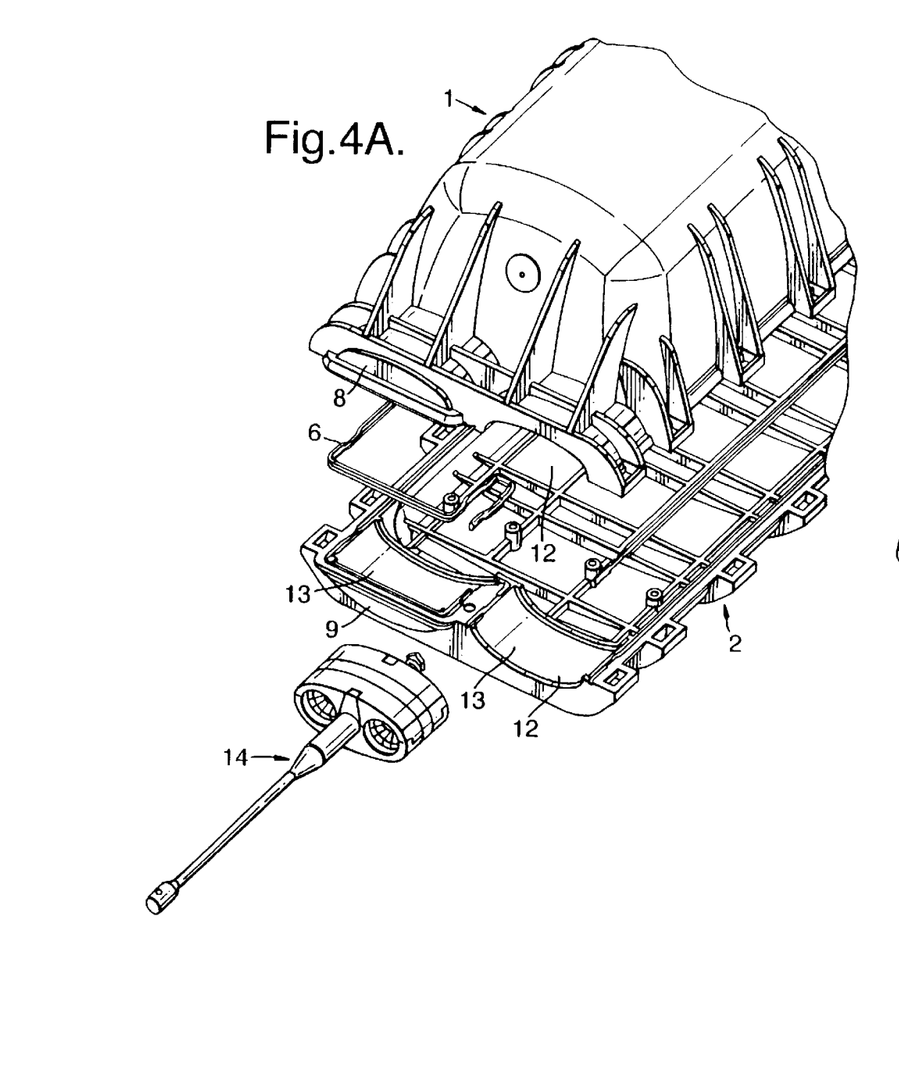
FIGS. 4a and 4b show installation of a cable sealing device and closure of the half shells.
Figure 4B:
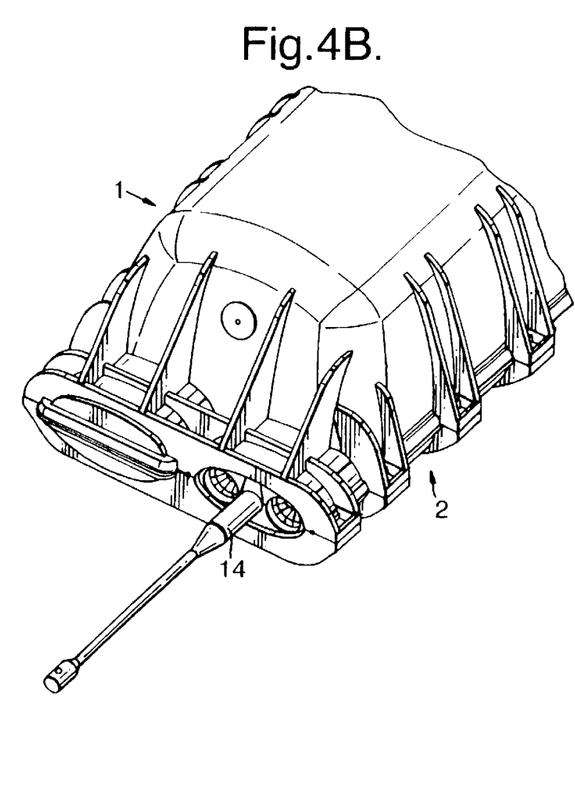

FIGS. 4a and 4b show assembly of the closure, although again cables are omitted for clarity. In FIG. 4a the half shells 1, 2, the sealing strip 6, and the cable sealing device 14 are shown separated. One cable entry port 12 is shown open, and a second potential cable entry port remains closed by removable portions 8, 9. The open port 12 may have been provided by removal of removable portions similar to those illustrated at 8, 9 or the half shells may have been manufactured with that port 12 open. Since at least one port will always be required it is not necessary that all ports initially be closed unless the installer requires full flexibility as to which ports are to be closed. In FIG. 4b the cable sealing device 14 has been placed in the chamber 13 and the half shells have been brought together.

Figure 5A:
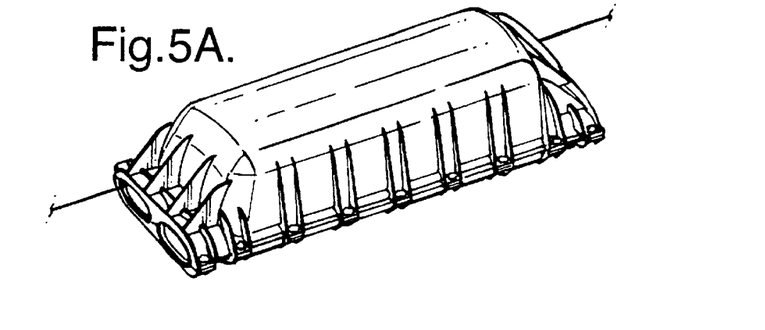
FIGS. 5a, 5b, 5c and 5d show a cable closure enclosing splices of various cable configurations.
Figure 5B:
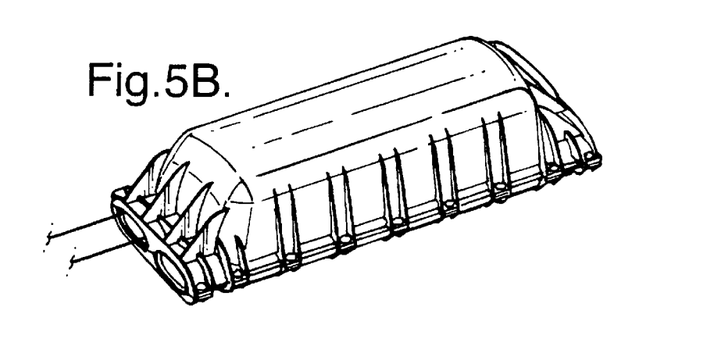
Figure 5C:
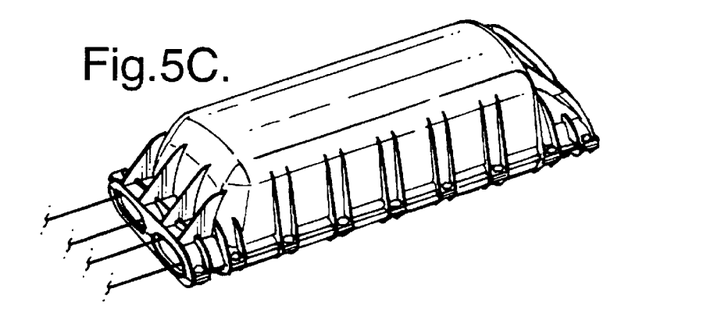
Figure 5D:
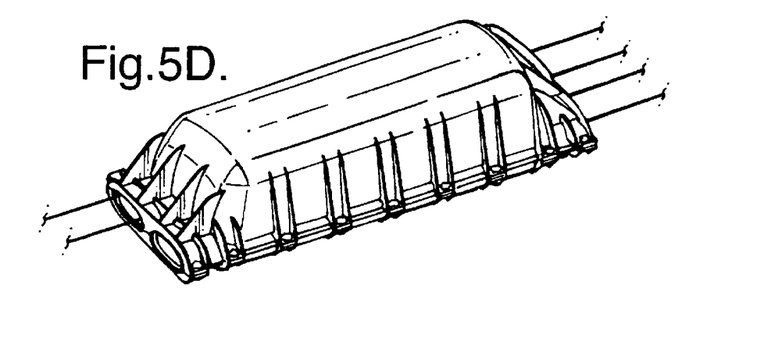

FIGS. 5a, 5b, 5c and 5d show alternative cable splice configurations. FIG. 5a shows a one-in one out in-line splice. FIG. 5b shows a butt splice between two cables, both of which enter the closure through a single port. In this arrangement, if the half shells were provided with one port originally open, then installation in this case would not require removal of any of the removable portions. It can be seen that the two cables make use of the two holes in a single cable sealing device. Alternatively, a two cable butt splice could be protected using both of the two side-by-side ports. Other cable configurations are shown in FIGS. 5c and 5d. Further flexibility can be achieved by using a plug within one of the holes in the cable sealing device 14, and that is what has been done in FIG. 5a.

FIGS. 6 to 10 illustrate a new sealing strip for use in the closure of the invention, and designs of half-shells preferred for the new sealing strip. The sealing strip preferably comprises an elastomeric material such as a rubber, and is preferably extruded. FIG. 6A shows in transverse cross-section a part of the closure illustrated in FIG. 1. Half-shells 1, 2 are shown slightly separated before being closed around sealing strip 6. The peripheral region 7 of the lower half-shell 2 can be seen. Each of the half-shells 1, 2 has a groove 29a, 29b, for receipt of part of the sealing strip 6. Grooves 29a and 29b are preferably substantially similar in shape to one another, more preferably mirror images. Each groove preferably has a recess 30 that extends away from the plane separating the two half-shells. Such recess preferably extends substantially perpendicular to that plane. The sealing strip 6 preferably has extensions, generally in the form of lips or flanges 31 that extend above and below the main body of the sealing strip and that extend into the recesses 30. As a result the sealing strip becomes trapped in the half-shells, 1, 2 against lateral movement (i.e. horizontally, or across the page, in FIG. 6a). This can be desirable where it is necessary for the sealing strip 6 to be open to the inside of the closure in order that it contact sealing material 21 on sealing device 14 (see FIG. 1) at the so-called triple point 25. It can be desirable for sealing strip 6 to be thus located in order to avoid its displacement where a sealing device 14 has not been installed. Furthermore, the sealing strip 6 may be provided with one or more means such as a barb or other projection 32 by means of which the lip or flange 31 may be made an interference fit in recess 30. In this way the sealing strip 6 can be installed in one of the half-shells, 1,2 and retained in position whilst the other half-shell is brought into position. In particular, I prefer that the flanges and recesses be so arranged that the sealing strip be predictably retained in a given one of the half-shells and therefore be released from the other half-shell when the half-shells are separated. This can be achieved by one flange being a tighter interference fit in one half-shell than the other flange is in the other half-shell. Alternatively or additionally one only of the flanges and half-shells could interlock. I prefer that the recesses in each half-shell be substantially identical and that this preferential retention result from one only of this flanges being sized to result in its retention in a recess.

Figure 6A:
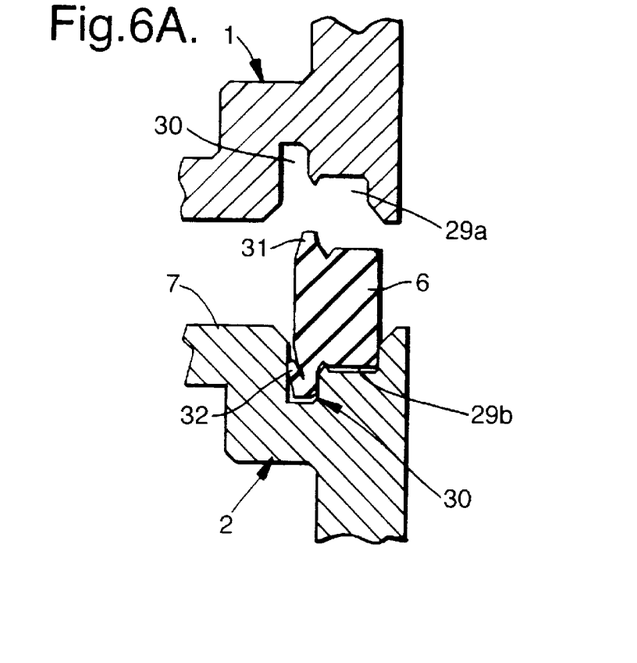
Figures 6B, 6C:
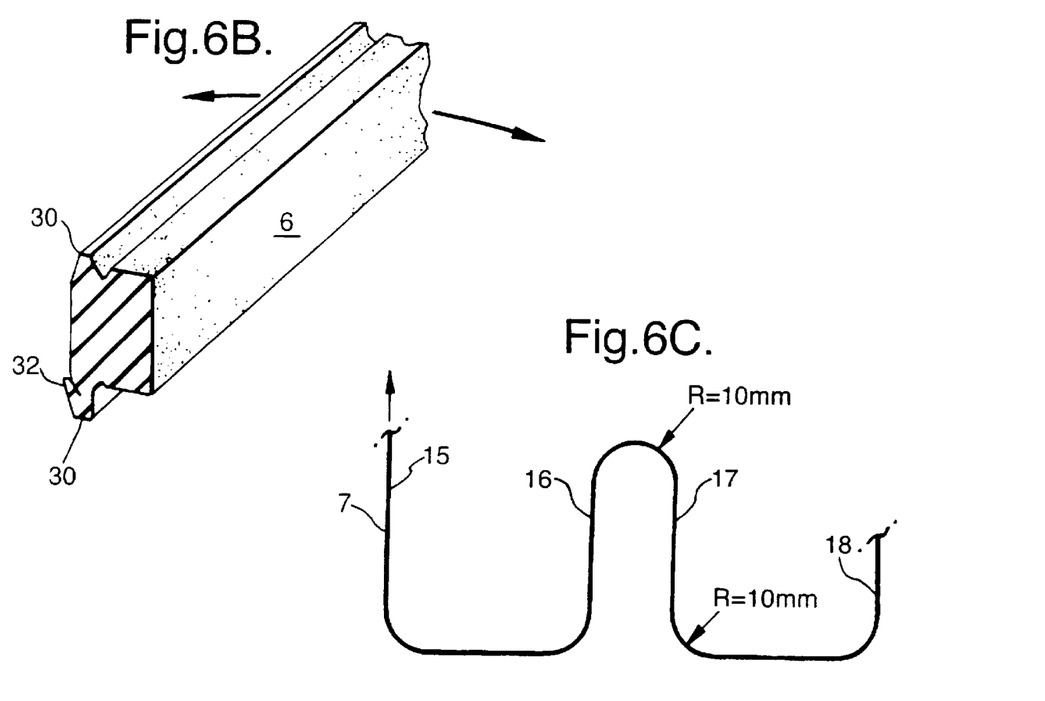

FIG. 6b illustrates a short length of a sealing strip 6. The arrows indicate its preferred lateral flexibility. This ability is further illustrated in FIG. 6c which shows the extent to which may usefully be bent when installed in a closure such as that as illustrated in FIG. 1. The longitudinal edges of 15, 16, 17 and 18 of the chambers 13 at FIG. 1 are marked on FIG. 6c. It is preferred that the strip 6 be able to pass around curves of bend radius 10 mm or less.

Figure 7A:
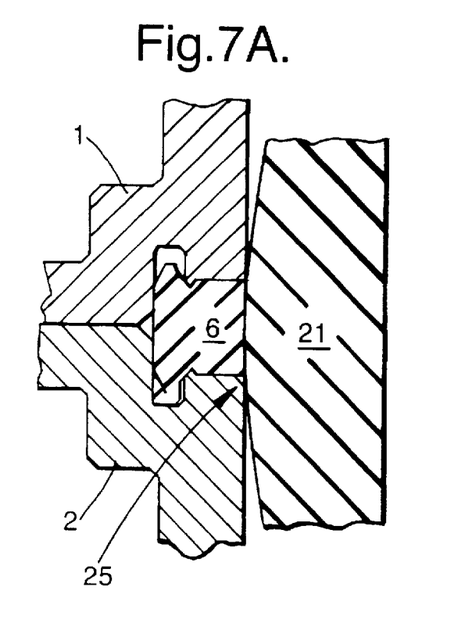
Figure 7B:
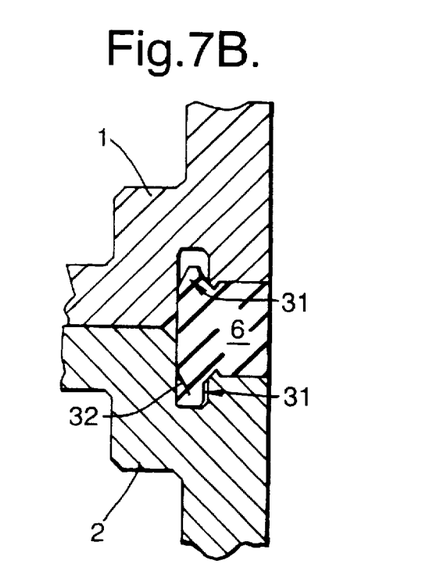
Figure 8A:
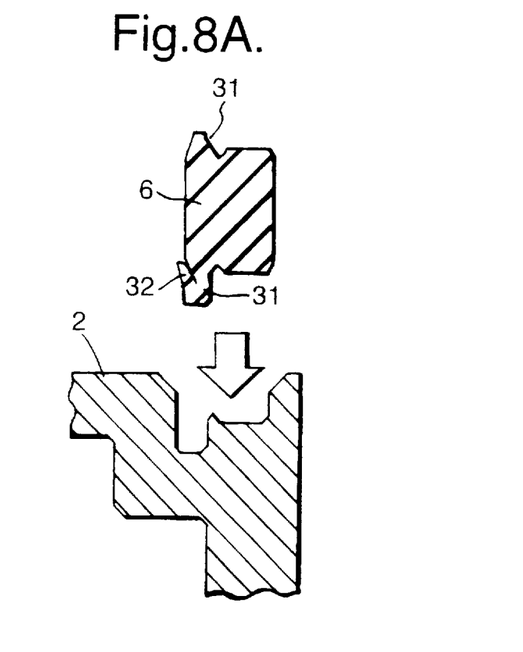
Figure 8B:
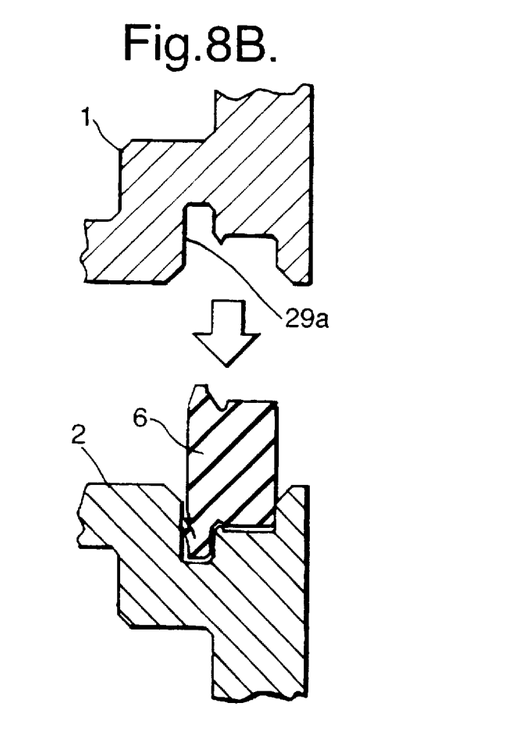
Figure 8C:
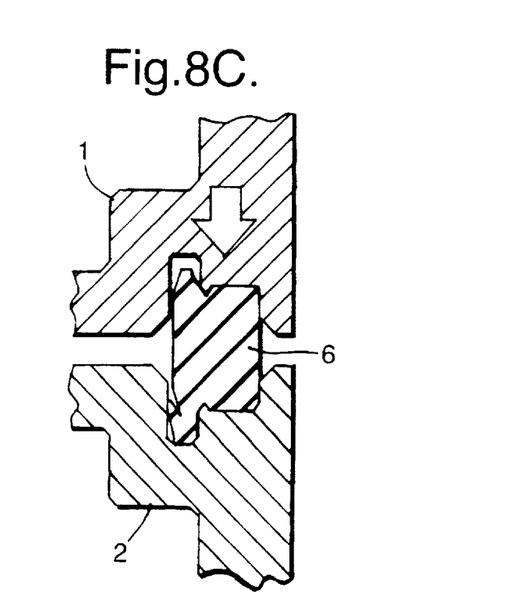
Figure 8D:
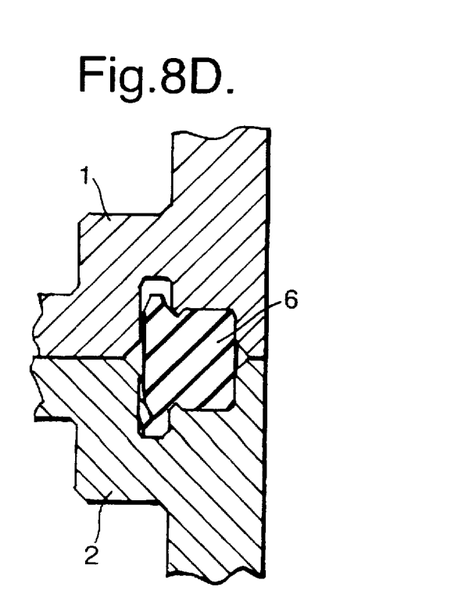

FIGS. 7a and 7b show the sealing strip installed between half-shells 1, 2 after those half-shells have been brought together. In FIG. 7A the sealing strip 6 is shown forming a seal to sealing material 21 of a sealing device 14 as illustrated in FIG. 1. The area of intersection, the triple point, is labeled 25. In FIG. 7b, however, the sealing device 14 is absent and as a result the edge of the sealing strip 6 appears at the interior wall of the closure, unconstrained by sealing material 21. It is this situation that the lips 31 are of particular benefit to retain the sealing strip in position. This situation will arise, for example, where a closure is to be used around fewer than its maximum possible complement of cables. In that case the removable portions 8, 9 will not, in general, have been removed.

FIGS. 8a, 8b, 8c and 8d show installation of sealing strip 6 in half-shell 2, and the formation of a closure by bringing into position the other half-shell 1.

Figure 9A:
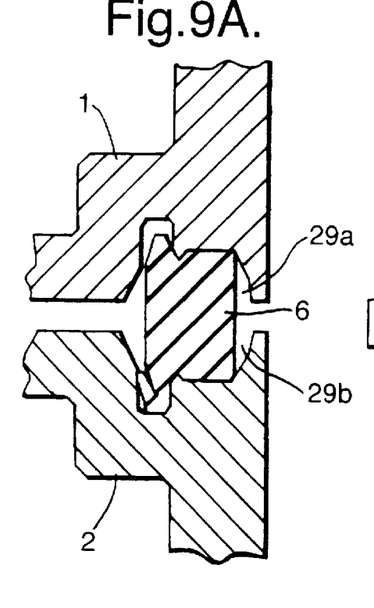
FIGS. 9A–B and FIG. 10, illustrate a new sealing strip for use in the closure of the invention, and designs of half-shells preferred for the new sealing strip.
Figure 9B:
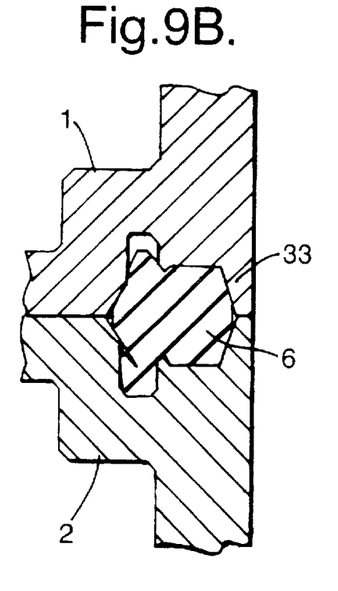
Figure 10:
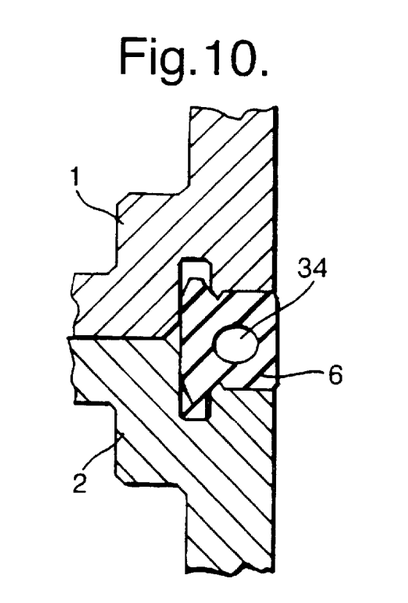

FIGS. 9a and 9b compare two designs of half-shells 1, 2 and sealing strip 6. In FIG. 9b the half-shells and the sealing strip have been designed such that the displacement of material of the sealing strip where the half-shells are brought together is such (say about 20% thereof) that the recesses 29a, 29b are substantially filled by the material constituting the sealing strip. In FIG. 10 a sealing strip 6 having a hollow interior 34 is used. This hollow interior may be provided in order to reduce the compression force required to install the seal.

In general, therefore, I prefer a sealing strip that has one or more projections, preferably running along its length and preferably continuously, that restrict any tendency of the sealing strip to be displaced into or out of the closure along a plane that separates the half-shells 1,2. Correspondingly, I prefer that the half-shells be provided with grooves 29a, 29b for receipt of the sealing strip and that those grooves are provided with recesses 30 extended away from the plane between the half-shells.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A cable closure comprising:
   a) half shells that together form an enclosed space for housing a cable;
   b) a sealing strip positioned between a peripheral region of each half shell to seal the enclosed space;
   at least one of the half shells having a removable portion that, when removed, provides a cable entry port between the two half shells, the sealing strip providing a seal between the removable portion of the at least one of the half shells and the other of the half shells; and
   wherein at least one of the half shells is shaped to define, adjacent and inwardly of said cable entry port, a chamber for receiving a cable sealing device; and in which the sealing strip runs along opposing longitudinal sides of said chamber such that, when the cable sealing device is received in the chamber, the sealing strip at each said longitudinal side contacts each half shell and the cable sealing device.

2. A cable closure according to claim 1 having at least two of said removable portions side-by-side to provide at least two side-by-side of said cable entry ports.

3. A cable closure according to claim 1 having at least two side-by-side removable portions, in which at least one of the half shells is shaped to define, adjacent and inwardly of each said removable portion, a chamber for receiving a cable sealing device, one of which is said chamber defined inwardly of said cable entry port; and in which the sealing strip runs along opposing longitudinal sides of each chamber such that, when a cable sealing device is in each chamber, the sealing strip at each said side contacts each half shell and the respective cable sealing device, separate portions of the sealing strip running between the chambers along each of the adjacent longitudinal sides.

4. A cable closure according to claim 3, in which the separate portions of the sealing strip running between the chambers along each of the adjacent longitudinal sides are joined together at a position towards an inward end of the chambers, the half shells each having a hole therethrough for receipt of means to hold them together, the holes being positioned between the separate portions and outwardly of the position at which the separate portions are joined.

5. The cable closure of claim 1 wherein the sealing strip contacts the cable sealing device at a region intermediate longitudinal ends of the chamber.

6. A cable closure comprising:
a) half shells that together form an enclosed space for housing a cable;
b) a sealing strip positioned between a peripheral region of each half shell to seal the enclosed space;
at least one of the half shells having a removable portion that, when removed, provides a cable entry port between the two half shells, the sealing strip providing a seal between the removable portion of the at least one of the half shells and the other of the half shells; and
wherein the removable portion is an integral part of the half shell, a border of the removable portion being defined at least in part by at least one of a line of weakness or a visual indication.

7. A cable closure comprising:
a) half shells that together form an enclosed space for housing a cable;
b) a sealing strip positioned between a peripheral region of each half shell to seal the enclosed space;
at least one of the half shells having a removable portion that, when removed, provides a cable entry port between the two half shells, the sealing strip providing a seal between the removable portion of the at least one of the half shells and the other of the half shells; and
wherein the half shells are shaped to define, adjacent and inwardly of said cable entry port, a chamber for receiving a cable sealing device, the chamber having a cross-section that is substantially wholly concave.

8. A cable closure comprising:
a) half shells that together form an enclosed space for housing a cable;
b) a sealing strip positioned between a peripheral region of each half shell to seal the enclosed space;
at least one of the half shells having a removable portion that, when removed, provides a cable entry port between the two half shells, the sealing strip providing a seal between the removable portion of the at least one of the half shells and the other of the half shells; and
having, adjacent and inwardly of said cable entry port, a chamber for receiving a cable sealing device; the cable closure additionally comprising said cable sealing device.

9. A cable closure according to claim 8, in which the cable sealing device comprises along an axis thereof first and second end parts and a sealing material between them, the first and second end parts and the sealing material each allowing a cable to pass through them; the cable sealing device having means to bring the first and second end parts together thereby putting the sealing material under compression axially, causing the sealing material to be displaced radially to contact a cable therein and the chamber therearound.

10. A cable closure according to claim 9, in which the sealing material comprises a gel.

11. A cable closure according to claim 9, in which the cable sealing device has means for allowing at least two cables to pass therethrough.

12. A method of enclosing a cable, the method comprising:
a) providing a cable closure having two half shells positioned adjacent each other to define an enclosed space for housing the cable with a sealing strip postioned between a peripheral region of each of the half shells, at least one of the half shells having a removable portion defining a cable entry port therein when removed, the sealing strip having a portion providing a seal between the removable portion and the other of the half shells when the removable portion is not removed;
b) removing said removable portion;
c) removing that portion of the sealing strip that provided a seal between said removable portion and said other shell of the half shells; and
d) bringing the half shells together around the cable such that a cable passes through the port provided by removal of the removable portion; and
wherein the cable closure is shaped to define, adjacently and inwardly of said port, a chamber for receiving a cable sealing device, and in which the sealing strip runs along opposing longitudinal sides of said chamber, wherein the step of bringing the half shells together around the cable further comprises causing the sealing strip running along opposing longitudinal sides of said chamber to contact each half shell and the cable sealing device.

13. The method of claim 2 wherein the sealing strip contacts the cable sealing device at a region intermediate longitudinal ends of the chamber.

* * * * *